(12) United States Patent
Sun et al.

(10) Patent No.: US 9,957,405 B2
(45) Date of Patent: May 1, 2018

(54) CROSS-LINKABLE POLYMERIC COMPOSITIONS, METHODS FOR MAKING THE SAME, AND ARTICLES MADE THEREFROM

(71) Applicant: Dow Global Technologies LLC, Midland, MI (US)

(72) Inventors: Yabin Sun, Shanghai (CN); Timothy J. Person, Pottstown, PA (US); Jeffrey M. Cogen, Flemington, NJ (US); Journey Lu Zhu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days. days.

(21) Appl. No.: 14/416,326

(22) PCT Filed: Sep. 11, 2013

(86) PCT No.: PCT/CN2013/083289
§ 371 (c)(1),
(2) Date: Jan. 22, 2015

(87) PCT Pub. No.: WO2014/040532
PCT Pub. Date: Mar. 20, 2014

(65) Prior Publication Data
US 2015/0203701 A1     Jul. 23, 2015

(30) Foreign Application Priority Data

Sep. 12, 2012  (WO) ............... PCT/CN2012/081275

(51) Int. Cl.
*H01B 7/00*   (2006.01)
*C09D 123/06* (2006.01)
(Continued)

(52) U.S. Cl.
CPC .......... *C09D 123/06* (2013.01); *C08K 5/0025* (2013.01); *C08K 5/12* (2013.01);
(Continued)

(58) Field of Classification Search
USPC ............... 174/110 R–110 E, 120 R–121 R
See application file for complete search history.

(56) References Cited

U.S. PATENT DOCUMENTS

| | | | |
|---|---|---|---|
| 4,018,852 A | | 4/1977 | Schober |
| 4,049,757 A | * | 9/1977 | Kammel ................. C08J 7/18 264/236 |

(Continued)

FOREIGN PATENT DOCUMENTS

| | | |
|---|---|---|
| JP | S47-048348 | 5/1972 |
| JP | S48-001041 | 12/1972 |

(Continued)

OTHER PUBLICATIONS

PCT/CN2012/081275, International Search Report and Written Opinion dated Jun. 13, 2013.

(Continued)

*Primary Examiner* — William H Mayo, III

(57) ABSTRACT

Cross-linkable polymeric compositions having an ethylene-based polymer, an organic peroxide, and a polyallyl cross-linking coagent, where the polyallyl cross-linking coagent and the organic peroxide are present in amounts sufficient to provide an allyl-to-active oxygen molar ratio of at least 1.6, based on the allyl content of the polyallyl cross-linking coagent and the active oxygen content of the organic peroxide. Such cross-linkable polymeric compositions can be employed in forming coated conductors.

15 Claims, 1 Drawing Sheet

$$ts1'@140°C = -7.97 + 167.91/(MH-ML)@180°C$$

(51) Int. Cl.
*C08K 5/14* (2006.01)
*C08K 5/00* (2006.01)
*C08K 5/3492* (2006.01)
*C08K 5/12* (2006.01)
*H01B 7/02* (2006.01)
*H01B 13/06* (2006.01)

(52) U.S. Cl.
CPC .............. *C08K 5/14* (2013.01); *C08K 5/3492* (2013.01); *C08K 5/34924* (2013.01); *H01B 7/02* (2013.01); *H01B 13/06* (2013.01)

(56) References Cited

U.S. PATENT DOCUMENTS

| | | | |
|---|---|---|---|
| 4,526,916 | A | 7/1985 | White |
| 5,346,961 | A * | 9/1994 | Shaw .................... C08F 255/02 264/211.24 |
| 5,405,915 | A | 4/1995 | Hess et al. |
| 5,994,473 | A | 11/1999 | Sempio et al. |
| 6,086,792 | A * | 7/2000 | Reid ........................ H01B 1/24 174/102 SC |
| 6,127,482 | A | 10/2000 | Keogh |
| 6,143,822 | A | 11/2000 | Caronia et al. |
| 6,191,230 | B1 | 2/2001 | Keogh et al. |
| 6,228,917 | B1 * | 5/2001 | Keogh ................. C08K 5/0025 524/333 |
| 6,262,157 | B1 | 7/2001 | Cogen et al. |
| 7,189,764 | B2 | 3/2007 | Sueda et al. |
| 7,226,964 | B2 | 6/2007 | Debaud et al. |
| 2002/0169238 | A1 * | 11/2002 | Caronia ................... C08K 5/14 524/100 |
| 2010/0016515 | A1 * | 1/2010 | Chaudhary .......... C08K 5/0025 525/375 |
| 2010/0101823 | A1 * | 4/2010 | Eaton ....................... H01B 3/18 174/110 SR |
| 2010/0292404 | A1 * | 11/2010 | Hampton ................ C08L 23/06 525/191 |
| 2011/0147041 | A1 * | 6/2011 | Sengupta ................ C08L 23/06 174/110 SR |
| 2011/0162869 | A1 * | 7/2011 | Smedberg ............. C08F 210/02 174/120 SR |
| 2011/0180304 | A1 * | 7/2011 | Smedberg ................ B32B 27/32 174/119 C |
| 2013/0062467 | A1 | 3/2013 | Soenarjo |

FOREIGN PATENT DOCUMENTS

| | | |
|---|---|---|
| JP | S49-029006 | 7/1974 |
| JP | S50-032239 | 3/1975 |
| JP | S54-038342 | 3/1979 |
| JP | 2001-325834 | 11/2001 |
| JP | 8302082 | 12/2008 |
| JP | 2009-114267 | 5/2009 |
| JP | 200919119 | 8/2009 |
| WO | WO 2011/093211 A * | 8/2011 ............ H01R 43/00 |

OTHER PUBLICATIONS

PCT/CN2012/081275, International Preliminary Report on Patentability, dated Mar. 17, 2015.
Donnet, et al., Carbon Black Science and Technology, 2nd Ed. 1993, p. 395.
Vanderbilt Chemicals, LLC, "Agerite Resin D", Specification, Jun. 1, 2001.
English translation of Office Action dated Aug. 22, 2017, in Japanese patent application No. 2015-530287.
Jaworska, et al., "Irradiation of Polyethylene in the Presence of Antioxidants", Radiat. Phys. Chem., vol. 37, No. 2, 1991, pp. 285-290.
Gal., et al., "The Effects of the Nature of the Antioxidant on the Radiation Crosslinking of Polyethylene", Radiat. Phys. Chem., vol. 26, No. 3, pp. 325-330, 1985.

* cited by examiner

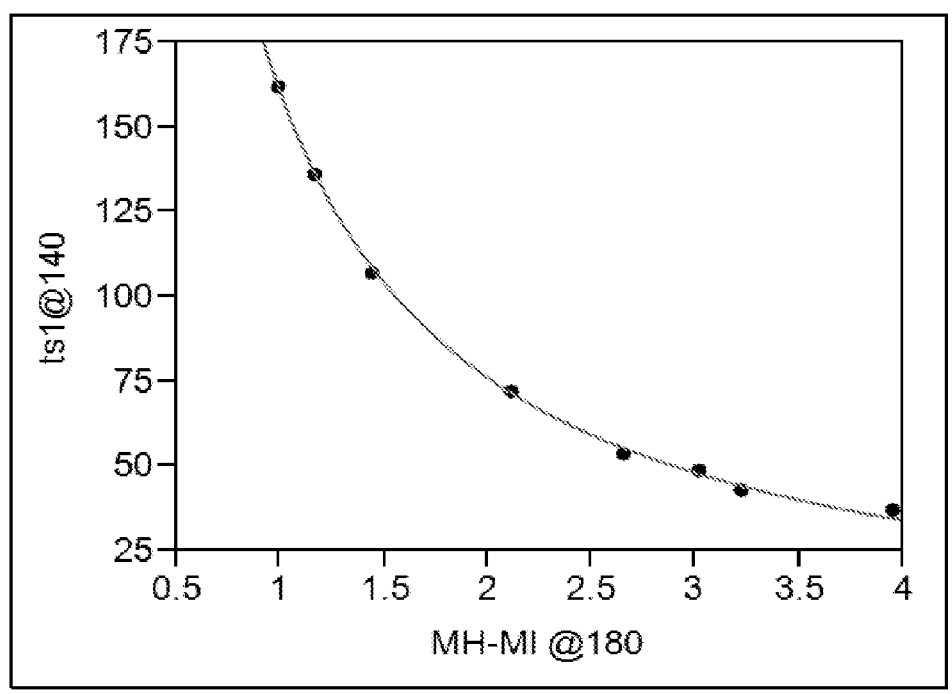
$$ts1'@140°C = -7.97 + 167.91/(MH-ML)@180°C$$

CROSS-LINKABLE POLYMERIC COMPOSITIONS, METHODS FOR MAKING THE SAME, AND ARTICLES MADE THEREFROM

REFERENCE TO RELATED APPLICATIONS

The present application claims the benefit of International Application No. PCT/CN2012/081275, filed on Sep. 12, 2012.

FIELD

Various embodiments of the present invention relate to cross-linkable polymeric compositions. Other aspects of the invention concern cross-linked ethylene-based polymer compositions.

INTRODUCTION

Medium, high, and extra-high voltage ("MV," "HV," and "EHV") cables typically contain a peroxide cross-linked ethylene-based polymer material as an insulation layer. Although cross-linking provides valuable improvement in thermomechanical properties of the material, the peroxide used for cross-linking creates byproducts that require removal from the material after it is formed into an insulation layer (e.g., by degassing) but before a jacketing layer is placed over the insulation layer. In the case of dicumyl peroxide, these byproducts include methane, acetophenone, alpha methylstyrene, and cumyl alcohol. To reduce the amount of byproducts, the use of cross-linking coagents has been investigated, which can be used to lower the amount of peroxide employed for cross-linking. Although advances in such coagents have been achieved, improvements are still desired.

SUMMARY

One embodiment is a cross-linkable polymeric composition comprising:
  an ethylene-based polymer;
  an organic peroxide; and
  a polyallyl cross-linking coagent,
wherein said polyallyl cross-linking coagent and said organic peroxide are present in amounts sufficient to provide an allyl-to-active oxygen molar ratio of at least 1.6, based on the allyl content of said polyallyl cross-linking coagent and the active oxygen content of said organic peroxide.

Another embodiment is a process for producing a coated conductor, said process comprising:
  (a) coating a conductor with a cross-linkable polymeric composition, wherein said cross-linkable polymeric composition comprises an ethylene-based polymer, an organic peroxide, and a polyallyl cross-linking coagent; and
  (b) curing or allowing to cure at least a portion of said cross-linkable polymeric composition, thereby forming a cross-linked polymeric coating,
wherein said polyallyl cross-linking coagent and said organic peroxide are present in said cross-linkable polymeric composition in amounts sufficient to provide an allyl-to-active oxygen molar ratio of at least 1.6, based on the allyl content of said polyallyl cross-linking coagent and the active oxygen content of said organic peroxide.

BRIEF DESCRIPTION OF THE DRAWINGS

Reference is made to the accompanying drawings in which:

FIG. 1 is a plot of MH-ML @ 180° C. versus ts1' @ 140° C. used to determine the relationship between scorch time and cross-link density for peroxide-crosslinked polyethylene.

DETAILED DESCRIPTION

Various embodiments of the present invention concern cross-linkable polymeric compositions comprising an ethylene-based polymer, an organic peroxide, and a polyallyl cross-linking coagent. Additional embodiments concern cross-linked polymeric compositions prepared from such cross-linkable polymeric compositions. Further embodiments concern processes for producing a coated conductor using the cross-linkable polymeric compositions.

Cross-Linkable Polymeric Composition

As noted above, one component of the polymeric compositions described herein is an ethylene-based polymer. As used herein, "ethylene-based" polymers are polymers prepared from ethylene monomers as the primary (i.e., greater than 50 weight percent ("wt %")) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and tetrapolymers (four different monomer types)).

In various embodiments, the ethylene-based polymer can be an ethylene homopolymer. As used herein, "homopolymer" denotes a polymer comprising repeating units derived from a single monomer type, but does not exclude residual amounts of other components used in preparing the homopolymer, such as chain transfer agents.

In an embodiment, the ethylene-based polymer can be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the weight of the interpolymer. When an α-olefin is employed, the α-olefin can be a $C_{3-20}$ (i.e., having 3 to 20 carbon atoms) linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/butene, ethylene/1-hexene, ethylene/1-octene, ethylene/styrene, ethylene/propylene/1-octene, ethylene/propylene/butene, ethylene/butene/1-octene, and ethylene/butene/styrene.

In various embodiments, the ethylene-based polymer can be used alone or in combination with one or more other types of ethylene-based polymers (e.g., a blend of two or more ethylene-based polymers that differ from one another by monomer composition and content, catalytic method of preparation, etc). If a blend of ethylene-based polymers is employed, the polymers can be blended by any in-reactor or post-reactor process.

In various embodiments, the ethylene-based polymer can be selected from the group consisting of low-density polyethylene ("LDPE"), linear-low-density polyethylene ("LLDPE"), very-low-density polyethylene ("VLDPE"), and combinations of two or more thereof.

In an embodiment, the ethylene-based polymer can be an LDPE. LDPEs are generally highly branched ethylene homopolymers, and can be prepared via high pressure processes (i.e., HP-LDPE). LDPEs suitable for use herein can have a density ranging from 0.91 to 0.94. In various embodiments, the ethylene-based polymer is a high-pressure LDPE having a density of at least 0.915 g/cm$^3$, but less than 0.94 or less than 0.93 g/cm$^3$. Polymer densities provided herein are determined according to American Society for Testing and Materials ("ASTM") method D792. LDPEs suitable for use herein can have a melt index ($I_2$) of less than 20 g/10 min., or ranging from 0.1 to 10 g/10 min., from 0.5 to 5 g/10 min., from 1 to 3 g/10 min., or an $I_2$ of 2 g/10 min. Melt indices provided herein are determined according to ASTM method D1238. Unless otherwise noted, melt indices are determined at 190° C. and 2.16 Kg (a.k.a., $I_2$). Generally, LDPEs have a broad molecular weight distribution ("MWD") resulting in a high polydispersity index ("PDI;" ratio of weight-average molecular weight to number-average molecular weight).

In an embodiment, the ethylene-based polymer can be an LLDPE. LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging 0.916 to 0.925 g/cm$^3$. LLDPEs suitable for use herein can have a melt index ($I_2$) ranging from 1 to 20 g/10 min., or from 3 to 8 g/10 min.

In an embodiment, the ethylene-based polymer can be a VLDPE. VLDPEs may also be known in the art as ultra-low-density polyethylenes, or ULDPEs. VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm$^3$. VLDPEs suitable for use herein can have a melt index ($I_2$) ranging from 0.1 to 20 g/10 min., or from 0.3 to 5 g/10 min.

In an embodiment, the ethylene-based polymer can comprise a combination of any two or more of the above-described ethylene-based polymers.

Production processes used for preparing ethylene-based polymers are wide, varied, and known in the art. Any conventional or hereafter discovered production process for producing ethylene-based polymers having the properties described above may be employed for preparing the ethylene-based polymers described herein. In general, polymerization can be accomplished at conditions known in the art for Ziegler-Natta or Kaminsky-Sinn type polymerization reactions, that is, at temperatures from 0 to 250° C., or 30 or 200° C., and pressures from atmospheric to 10,000 atmospheres (1,013 megaPascal ("MPa")). In most polymerization reactions, the molar ratio of catalyst to polymerizable compounds employed is from $10^{-12}:1$ to $10^{-1}:1$, or from $10^{-9}:1$ to $10^{-5}:1$.

As noted above, the above-described ethylene-based polymer is combined with an organic peroxide. As used herein, "organic peroxide" denotes a peroxide having the structure: $R^1$—O—O—$R^2$, or $R^1$—O—O—R—O—O—$R^2$, where each of $R^1$ and $R^2$ is a hydrocarbyl moiety, and R is a hydrocarbylene moiety. As used herein, the term "hydrocarbyl" denotes a univalent group formed by removing a hydrogen atom from a hydrocarbon (e.g. ethyl, phenyl). As used herein, the term "hydrocarbylene" denotes a divalent group formed by removing two hydrogen atoms from a hydrocarbon. The organic peroxide can be any dialkyl, diaryl, dialkaryl, or diaralkyl peroxide, having the same or differing alkyl, aryl, alkaryl, or aralkyl moieties. In an embodiment, each of $R^1$ and $R^2$ is independently a $C_1$ to $C_{20}$ or $C_1$ to $C_{12}$ alkyl, aryl, alkaryl, or aralkyl moiety. In an embodiment, R can be a $C_1$ to $C_{20}$ or $C_1$ to $C_{12}$ alkylene, arylene, alkarylene, or aralkylene moiety. In various embodiments, R, $R^1$, and $R^2$ can have the same or a different number of carbon atoms, or any two of R, $R^1$, and $R^2$ can have the same number of carbon atoms while the third has a different number of carbon atoms.

Organic peroxides suitable for use herein include mono-functional peroxides and di-functional peroxides. As used herein, "mono-functional peroxides" denote peroxides having a single pair of covalently bonded oxygen atoms (e.g., having a structure R—O—O—R). As used herein, "di-functional peroxides" denote peroxides having two pairs of covalently bonded oxygen atoms (e.g., having a structure R—O—O—R—O—O—R). In an embodiment, the organic peroxide is a mono-functional peroxide.

Exemplary organic peroxides include dicumyl peroxide ("DCP"); tert-butyl peroxybenzoate; di-tert-amyl peroxide ("DTAP"); bis(t-butyl-peroxy isopropyl)benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)3,3,5-trimethylcyclohexane; isopropylcumyl cumylperoxide; butyl 4,4-di(tert-butylperoxy)valerate; di(isopropylcumyl) peroxide; and mixtures of two or more thereof. In various embodiments, only a single type of organic peroxide is employed. In an embodiment, the organic peroxide is dicumyl peroxide.

As noted above, the cross-linkable polymeric composition further includes a polyallyl cross-linking coagent. As used herein, "polyallyl" denotes a compound having at least two pendant allyl functional groups. In various embodiments, the cross-linking coagent is a triallyl compound. In certain embodiments the cross-linking coagent is selected from the group consisting of triallyl isocyanurate ("TAIC"), triallyl cyanurate ("TAC"), triallyl trimellitate ("TATM"), and mixtures of two or more thereof. In an embodiment, the cross-linking coagent is TAIC.

In various embodiments, the polyallyl cross-linking coagent constitutes all or substantially all of cross-linking coagents present in the cross-linkable polymeric composition. In some embodiments, the cross-linkable polymeric composition is free or substantially free of nitroxide compounds (e.g., (2,2,6,6-tetramethylpiperidin-1-yl)oxyl, or "TEMPO"). As used herein, "substantially free" denotes a concentration of less than 10 parts per million by weight based on the entire weight of the cross-linkable polymeric composition. In one or more embodiments, the cross-linkable polymeric composition is free or substantially free of vinyl-functional esters. In various embodiments, the cross-linkable polymeric composition is free or substantially free of acrylate compounds. In one or more embodiments, the cross-linkable polymeric composition is free or substantially free of di-vinyl styrene compounds. In various embodiments, the cross-linkable polymeric composition is free or substantially free of alkadiene, alkatriene, and/or alkatetraene compounds.

In various embodiments, the cross-linkable polymeric composition can comprise the ethylene-based polymer in an amount ranging from 50 to 98.9 wt %, from 80 to 98.9 wt %, from 90 to 98.9 wt %, or from 95 to 98.9 wt %, based on the entire cross-linkable polymeric composition weight. In certain embodiments, the ethylene-based polymer is present at a concentration ranging from 95.6 to 99.6 wt %, or from 97.5 to 98.5 wt %, based on the combined weight of the ethylene-based polymer, the organic peroxide, and the polyallyl cross-linking coagent. Additionally, the cross-linkable polymeric composition can comprise the organic peroxide in an amount ranging from 0.1 to 1.4 wt %, from 0.4 to 1.4 wt %, from 0.4 to 1.2 wt %, from 0.5 to 1.0 wt %, or from 0.7 to less than 1.0 wt %, based on the combined weight of the ethylene-based polymer, the organic peroxide, and the polyallyl cross-linking coagent. In an embodiment, the organic peroxide is present in the cross-linkable polymeric composition in an amount of less than 1.4 wt %, or less than 1.0 wt %, based on the combined weight of the ethylene-based polymer, the organic peroxide, and the polyallyl cross-linking coagent. Furthermore, the cross-linkable polymeric composition can comprise the polyallyl cross-linking coagent in an amount ranging from 0.5 to 3 wt %, from 0.7 to 3 wt %, from 1.0 to 3 wt %, or from 1.5 to 3 wt %, based on the combined weight of the ethylene-based polymer, the organic peroxide, and the polyallyl cross-linking coagent. In an embodiment, the polyallyl cross-linking coagent is present in the cross-linkable polymeric composition in an amount of at least 0.5 wt %, at least 0.85 wt %, or at least 1 wt %, based on the combined weight of the ethylene-based polymer, the organic peroxide, and the polyallyl cross-linking coagent.

In various embodiments, the polyallyl cross-linking coagent and the organic peroxide are present in a weight ratio of at least 1.0, at least 1.2, at least 1.5, or at least 2.0, and up to 10.0, cross-linking coagent/organic peroxide.

In various embodiments, the polyallyl cross-linking coagent and organic peroxide are present in amounts sufficient to achieve a molar ratio of allyl groups to active oxygen atoms of at least 1.6, at least 1.9, at least 2.5, or at least 3.0, and up to 5, up to 7.5, up to 10, up to 12, or up to 16 allyl groups/active oxygen atoms. In determining this ratio, only oxygen atoms present as one of two covalently bonded oxygen atoms in the organic peroxide are considered "active oxygen atoms." For example, a mono-functional peroxide has two active oxygen atoms. Oxygen atoms present in the organic peroxide or the polyallyl cross-linking coagent that are not covalently bonded to another oxygen atom are not considered active oxygen atoms. Additionally, only pendant allyl groups found on the polyallyl cross-linking coagent are included in the molar ratio of allyl groups/active oxygen atoms. The allyl-to-active oxygen molar ratio is calculated as follows:

$$\frac{\frac{(\text{moles polyallyl coagent})}{(\text{number of allyl groups per coagent molecule})}}{\frac{(\text{moles peroxide})}{(\text{number of active oxygen atoms per peroxide molecule})}}$$

The cross-linkable polymeric composition may also contain other additives including, but not limited to, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators. Additives, other than fillers, are typically used in amounts ranging from 0.01 or less to 10 or more wt % based on total composition weight. Fillers are generally added in larger amounts although the amount can range from as low as 0.01 or less to 65 or more wt % based on the total composition weight. Illustrative examples of fillers include clays, precipitated silica and silicates, fumed silica, calcium carbonate, ground minerals, aluminum trihydroxide, magnesium hydroxide, and carbon blacks with typical arithmetic mean particle sizes larger than 15 nanometers.

Additionally, an antioxidant can be employed with the cross-linkable polymeric composition. Exemplary antioxidants include hindered phenols (e.g., tetrakis [methylene (3,5-di-t-butyl-4-hydroxyhydrocinnamate)]methane); phosphites and phosphonites (e.g., tris(2,4-di-t-butylphenyl) phosphate); thio compounds (e.g., dilaurylthiodipropionate); various siloxanes; and various amines (e.g., polymerized 2,2,4-trimethyl-1,2-dihydroquinoline). Antioxidants can be used in amounts of 0.1 to 5 wt % based on the total weight of the cross-linkable polymeric composition. In the formation of wire and cable compositions, discussed below, antioxidants are typically added to the system before processing (i.e., prior to extrusion and cross-linking) of the finished article.

In various embodiments, the cross-linkable polymeric composition can be free or substantially free of anti-scorch agents. For example, the cross-linkable polymeric composition can be free or substantially free of $\alpha$-tocopherol.

In various embodiments, the cross-linkable polymeric composition can be free or substantially free of polyalkylene glycols. In various embodiments, the cross-linkable polymeric composition can be free or substantially free of elastomeric polymers. In various embodiments, the cross-linkable polymeric composition can be free or substantially free of carboxylic acid/ester-modified polymers (e.g., ethylene/ethyl acrylate copolymers).

Preparation of the cross-linkable polymeric composition can comprise compounding the above-described components. For example, compounding can be performed by either (1) compounding all components into the ethylene-based polymer, or (2) compounding all the components except for the organic peroxide, which is soaked in as described below. Compounding of the cross-linkable polymeric composition can be effected by standard equipment known to those skilled in the art. Examples of compounding equipment are internal batch mixers, such as a Brabender™, Banbury™, or Bolling™ mixer. Alternatively, continuous single or twin screw, mixers can be used, such as a Farrel™ continuous mixer, a Werner and Pfleiderer™ twin screw mixer, or a Buss™ kneading continuous extruder. Compounding can be performed at a temperature of greater than the melting temperature of the ethylene-based polymer up to a temperature above which the ethylene-based polymer begins to degrade. In various embodiments, compounding can be performed at a temperature ranging from 100 to 200° C., or from 110 to 150° C. In various embodiments, soaking the organic peroxide into the ethylene-based polymer can be performed at a temperature ranging from 30 to 100° C., from 50 to 90° C., or from 60 to 80° C.

Alternatively, in one or more embodiments, the organic peroxide and the polyallyl cross-linking coagent can be soaked into the ethylene-based polymer, either simultaneously or sequentially. In an embodiment, the organic peroxide and polyallyl cross-linking coagent can be premixed at the temperature above the melting temperature of the organic peroxide and polyallyl cross-linking coagent, whichever is greater, followed by soaking the ethylene-based polymer in the resulting mixture of the organic peroxide and polyallyl cross-linking coagent at a temperature ranging from 30 to 100° C., from 50 to 90° C., or from 60 to 80° C., for a period of time ranging from 1 to 168 hours, from 1 to 24 hours, or from 3 to 12 hours. In another embodiment, the ethylene-based thermoplastic polymer can be soaked in the organic peroxide at a temperature ranging from 30 to 100° C., from 50 to 90° C., or from 60 to 80° C., for a period of time ranging from 1 to 168 hours, from 1 to 24 hours, or from 3 to 12 hours, followed by soaking the ethylene-based polymer in polyallyl cross-linking coagent at a temperature ranging from 30 to 100° C., from 50 to 90° C., or from 60 to 80° C., for a period of time ranging from 1 to 168 hours, from 1 to 24 hours, or from 3 to 12 hours. In still another embodiment, the ethylene-based polymer can be soaked in the polyallyl cross-linking coagent at a temperature ranging from 30 to 100° C., from 50 to 90° C., or from 60 to 80° C., for a period of time ranging from 1 to 168 hours, from 1 to 24 hours, or from 3 to 12 hours, followed by soaking the ethylene-based polymer in organic peroxide at a temperature ranging from 30 to 100° C., from 50 to 90° C., or from 60 to 80° C., for a period of time ranging from 1 to 168 hours, from 1 to 24 hours, or from 3 to 12 hours. In yet another embodiment, the ethylene-based polymer can be soaked in organic peroxide and polyallyl cross-linking coagent without premixing at a temperature ranging from 30 to 100° C., from 50 to 90° C., or from 60 to 80° C., for a period of time ranging from 1 to 168 hours, from 1 to 24 hours, or from 3 to 12 hours.

Cross-Linked Polymeric Composition

The above-described cross-linkable polymeric composition can be cured or allowed to cure in order to form a cross-linked ethylene-based polymer. Such curing can be performed by subjecting the cross-linkable polymeric composition to elevated temperatures in a heated cure zone, which can be maintained at a temperature in the range of 175 to 260° C. The heated cure zone can be heated by pressurized steam or inductively heated by pressurized nitrogen gas. Thereafter, the cross-linked polymeric composition can be cooled (e.g., to ambient temperature).

The cross-linking process can create volatile decomposition byproducts in the cross-linked polymeric composition. The term "volatile decomposition products" denotes decomposition products formed during the curing step, and possibly during the cooling step, by initiation of the organic peroxide. Such byproducts can comprise alkanes, such as methane. In various embodiments, the cross-linked polymeric composition initially comprises (i.e., before degassing, described below) methane in a maximum amount of 860 parts per million ("ppm") or less, 750 ppm or less, 700 ppm or less, or 650 ppm or less, 600 ppm or less, 550 ppm or less, 500 ppm or less, 450 ppm or less, or 400 ppm or less, based on the entire cross-linked polymeric composition weight.

Following cross-linking, the cross-linked polymeric composition can undergo degassing to remove at least a portion of the volatile decomposition byproducts. Degassing can be performed at a degassing temperature, a degassing pressure, and for a degassing time period to produce a degassed polymeric composition. In various embodiments, the degassing temperature can range from 50 to 150° C., or from 60 to 80° C. In an embodiment, the degassing temperature is 65 to 75° C. Degassing can be conducted under standard atmosphere pressure (i.e., 101,325 Pa).

The extent of cross-linking in the cross-linked polymeric composition can be determined via analysis on a moving die rheometer ("MDR") at 180° C. according to ASTM D5289. Upon analysis, an increase in torque, as indicated by the difference between the maximum torque ("MH") and the minimum torque ("ML") ("MH-ML"), indicates greater degree of cross-linking. The resulting cross-linked polymeric composition can have an MH-ML of at least 2.5 dN·m, at least 2.75 dN·m, at least 3 dN·m, at least 3.25 dN·m, at least 3.5 dN·m, or at least 3.75 dN·m, with a practical upper limit of 6 dN·m. In an embodiment, the cross-linked polymeric composition can have an MH-ML ranging from 2.5 to 6 dN·m, from 2.75 to 6 dN·m from 3 to 6 dN·m, from 3.25 to 6 dN·m, from 3.5 to 6 dN·m, or from 3.75 to 6 dN·m.

In various embodiments, the cross-linked polymeric composition can have a scorch improvement ("SI") of at least 10, at least 11, at least 12, at least 15, or at least 20, and up to 25, up to 30, up to 40, up to 50, up to 60, or up to 70. Scorch improvement is determined according to the procedures described in the Test Methods section, below.

Coated Conductor

A cable comprising a conductor and an insulation layer can be prepared employing the above-described cross-linkable polymeric composition. "Cable" and "power cable" mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. Typical cable designs are illustrated in U.S. Pat. Nos. 5,246,783, 6,496,629 and 6,714,707. "Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

Such a cable can be prepared with various types of extruders (e.g., single or twin screw types) by extruding the cross-linkable polymeric composition onto the conductor, either directly or onto an interceding layer. A description of a conventional extruder can be found in U.S. Pat. No. 4,857,600. An example of co-extrusion and an extruder therefore can be found in U.S. Pat. No. 5,575,965.

Following extrusion, the extruded cable can pass into a heated cure zone downstream of the extrusion die to aid in cross-linking the cross-linkable polymeric composition and thereby produce a cross-linked polymeric composition. The heated cure zone can be maintained at a temperature in the range of 175 to 260° C. In an embodiment, the heated cure zone is a continuous vulcanization ("CV") tube. In various embodiments, the cross-linked polymeric composition can then be cooled and degassed, as discussed above.

Alternating current cables prepared according to the present disclosure can be low voltage, medium voltage, high voltage, or extra-high voltage cables. Further, direct current cables prepared according to the present disclosure include high or extra-high voltage cables.

Test Methods

Sample Preparation for Examples 1-6

For Examples 1-6, feed polyethylene ("PE") pellets containing antioxidant (~0.36 wt %) into a Brabender mixer at 130° C. with a rotor speed of 30 rpm and premix the cross-linking coagent once the PE melts. Mixing time after addition of cross-linking coagent is 5 minutes. Heat the resultant compound in an oven at 90° C. for 1 hour, then feed into a two roll mill at 120° C. Once the PE melts, the peroxide is added, followed by mixing at roll speed of 12 rpm and roll distance of 0.6 mm for 4 minutes. The PE employed is DFDA-4850NT, available from the Dow Chemical Company, Midland, Mich., USA, which has a density of 0.92 g/cm$^3$, and a melt index ($I_2$) of 2 g/10 min. The antioxidant employed is Cyanox 2212, already blended in DFDA-4850, available from Cytec Industries, Woodland Park, N.J., USA. The peroxide employed is dicumyl peroxide ("DCP"), available from Sigma-Aldrich, St. Louis, Mo., USA. The cross-linking coagents are described below.

Compression Molding

Using a Lab Tech LP-S-50/ASTM laboratory hydraulic press, preheat the sample covered on opposing sides by two polyethylene terephthalate ("PET") membranes in the mold at 130° C. for 5 minutes. Release air trapped in the sample by opening and closing the plate eight times. Increase the plate temperature to 182° C. over 5 minutes. Cure the sample under a pressure of 100 kN for 15 minutes. Decrease the plate temperature to 45° C. over 5 minutes.

Moving Die Rheometer

Perform moving die rheometer ("MDR") testing at 180° C. according to the methods described in ASTM D5289 on an Alpha Technologies MDR 2000 using samples cut from the sheet prepared by the two-roll mill or soaked pellets.

Mechanical (Tensile) Properties

Determine mechanical properties according to ASTM D638 on an Instron model 5565 tensile tester using compression-molded, cured samples.

Electrical Properties

Determine dielectrictic constant and dissipation factor at 50 or 60 Hz, as specified below, and 1 kV according to ASTM D150 on a 1-mm plaque using compression-molded, cured samples.

Scorch Improvement

Scorch improvement of a sample X prepared with both DCP and a polyallyl cross-linking coagent is calculated using the following formula:

$$SI = ts1@140° C. - ts1'@140° C.$$

where SI is the scorch improvement, ts1@140° C. is the scorch time of sample X measured by MDR at 140° C., and ts1'@140° C. is the predicted scorch time of a theoretical sample having the same formulation as sample X but having no cross-linking coagent, where the prediction is based on the cross-link (MH-ML) density of sample X. The predicted scorch time is calculated according to the following formula (1):

$$ts1'@140° C. = -7.97 + (167.91/(MH\text{-}ML@180° C.))$$

where MH-ML@180° C. is the cross-link density of sample X measured via MDR at 180° C. Formula (1) is determined based on comparisons of eight samples prepared with polyethylene and dicumyl peroxide alone (i.e., no cross-linking coagent) to determine the relationship between scorch time and cross-link density (MH-ML) for samples having no cross-linking coagent. The samples are prepared as described above in the Sample Preparation section according to the formulas in Table 1, and analyzed via MDR according to the above-provided methods:

TABLE 1

Scorch Improvement Formula (1) Determination Samples

|  | SIS1 | SIS2 | SIS3 | SIS4 | SIS5 | SIS6 | SIS7 | SIS8 |
|---|---|---|---|---|---|---|---|---|
| PE (wt %) | 99.3 | 99.2 | 99.075 | 98.8 | 98.6 | 98.4 | 98.3 | 98 |
| DCP (wt %) | 0.7 | 0.8 | 0.925 | 1.2 | 1.4 | 1.6 | 1.7 | 2 |
| Total | 100 | 100 | 100 | 100 | 100 | 100 | 100 | 100 |
| ML @180° C. | 0.17 | 0.18 | 0.17 | 0.18 | 0.19 | 0.19 | 0.19 | 0.19 |
| MH @180° C. | 1.16 | 1.35 | 1.62 | 2.3 | 2.85 | 3.21 | 3.43 | 4.15 |
| MH – ML @180° C. | 0.99 | 1.17 | 1.45 | 2.12 | 2.66 | 3.02 | 3.24 | 3.96 |
| T90 @180° C. | 4.95 | 4.03 | 4.70 | 4.49 | 4.54 | 4.40 | 4.41 | 4.20 |
| ts1 @180° C. | 2.08 | 1.81 | 2.79 | 1.83 | 1.54 | 1.39 | 1.31 | 1.14 |
| ts1 @140° C. | 162.00 | 136.00 | 106.9 | 71.78 | 53.13 | 48.34 | 43.52 | 36.58 |

Plotting the data provided in Table 1 using MH-ML @ 180° C. versus ts1 @ 140° C. yields formula (1). JMP™ statistical discovery software is employed to fit the data in Table 1 to arrive at formula (1). The relationship between MH-ML and ts1 @ 140° C. is reciprocal (at least within the common range of DCP loading). Therefore MH-ML is first transformed to its reciprocal form, 1/(MH-ML), then fit a line between ts1@140° C. and 1/(MH-ML). This yields the equation (formula (1)) between ts1 @ 140° C. and MH-ML.

The steps employed for generating formula (1) in the JMP™ statistical discovery software are listed below
1. Click Analyze/Fit Y by X;
2. Pick up MH-ML into X, factor and ts1@140° C. into Y, response;
3. Click the top left red triangle, select "fit special";
4. Select Reciprocal: 1/x in X transformation column and click OK button.

The results of this analysis are provided in FIG. 1.

Regarding values for Scorch Improvement, a negative SI indicates a worsening anti-scorch property, where a positive SI indicates an improved anti-scorch property, with higher positive SI values being preferred for superior end use performance.

Methane Content (Multiple Headspace Extraction Via Headspace Gas Chromatography)

Perform Multiple Headspace Extraction ("MHE") using Headspace Gas Chromatography ("HSGC") using the following conditions:
Instrumentation
Gas chromatograph Agilent 6890
Injection port Split/splitless
Column DB-5MS, 30 m×0.32 mm×1.0 mm
Detector FID
Sample introduction G1888
Data collection ChemStation
G1888 Headspace Conditions
GC cycle time 60 minutes
Oven temperature 150° C.
Loop temperature 160° C.
Transfer line temperature 170° C.
Vial equilibration time 60 minutes
Shaking speed Off
Loop fill time 0.20 minutes
Loop equilibration time 0.05 minutes
Inject time 0.50 minutes
Pressurization time 0.50 minutes
Advance functions Multi HS EXT on; 5 extractions per vial
6890 GC Conditions
Carrier gas (EPC) Nitrogen, 2.0 mL/min
Inlet temperature 250° C.
Split ratio 1:10
Flow mode Constant flow
FID temperature 300° C.
Oven Program 40° C., hold for 3 min;
  ramp to 280° C. at a rate of 15° C./min;
  hold for 5 minutes. (24 min in all)
Detector FID @ 300° C.;
  Hydrogen 40 mL/min; Air 450 mL/min; Make up (Nitrogen) 45 mL/min
Equilibrate the sample at some temperature for a given amount of time and analyze the headspace above the sample. Repeat this equilibration and measurement process multiple times, and an exponential decrease in the peak areas is observed. Place ~1.0 g samples into 22-mL headspace vials and analyze according to the conditions given above.

$$\sum_{n=1}^{\infty} A_n = A_1/(1-e^{-K})$$  Eq. (1)

$A_n$ = the peak area of the $n^{th}$ injection
$A_1$ = the peak area of the $1^{st}$ injection
According to Eq. (1), only two values are needed to calculate the total peak areas: A1 and the constant K. The former is a measured value while the latter can be obtained from linear regression analysis of the following equation:

$$\ln A_n = -K(n-1) + \ln A_1$$  Eq. (2):

Having the sum of the peak area values one only needs a calibration factor expressing the relationship between peak area and the concentration (amount) of the analyte.

Methane Standard Calibration Curve

Inject the following methane amounts into HSGC vials, 200 μl, 400 μl, 500 μl, 600 μl, 800 μl and 1000 μl. Build up the correlation between total peak area $$\left(\sum_{n=1}^{\infty} A_n\right)$$

and methane content. Put two pieces of the compression-molded sample (prepared as described above) with size of 10 mm×50 mm×1 mm into HSGC vial for HSGC test to get the total peak area $$\left(\sum_{n=1}^{\infty} A_n\right).$$

Then prepare a standard calibration curve of area versus μl of methane, and use this standard calibration curve to calculate methane content (μl/g) based on total peak area $$\left(\sum_{n=1}^{\infty} A_n\right)$$

for each sample. Then the unit of methane content was transformed from μl/g to ppm by calculating through density of methane.

Density

Determine density according to ASTM D792.

Melt Index

Measure melt index, or $I_2$, in accordance with ASTM D1238, condition 190° C./2.16 kg, and report in grams eluted per 10 minutes. Measure $I_{10}$ in accordance with ASTM D1238, condition 190° C./10 kg, and report in grams eluted per 10 minutes.

EXAMPLES

Example 1—Cross-Linking Polyethylene with High Triallyl Coagent:DCP Ratio

Prepare and cure five Comparative Samples (CS1-CS5) and nine Samples (S1-S9) according to the formulations shown in Table 2, below, using the procedures described in the Test Methods section, above. The triallyl isocyanurate ("TAIC") (99%) employed is available from Shanghai Fangruida Chemicals Co., Ltd. The triallyl cyanurate ("TAC") (97%) employed is available from Fluka AG. The triallyl trimellitate ("TATM") (96%) employed is available from Meryer (Shanghai) Chemical Technology Co., Ltd. The polyethylene and DCP employed are the same as described in the Test Methods section, above.

TABLE 2

Compositions of CS1-CS6 and S1-S9

| Sample: | Polyethylene (wt %) | DCP (wt %) | TAIC (wt %) | TATM (wt %) | TAC (wt %) | Coagent: DCP (weight) | Allyl: Active Oxygen (molar) |
|---|---|---|---|---|---|---|---|
| CS1 | 98.30 | 1.7 | — | — | — | — | — |
| CS2 | 98.30 | 1.6 | 0.1 | — | — | 0.06 | 0.1 |
| CS3 | 98.30 | 1.4 | 0.3 | — | — | 0.21 | 0.4 |
| CS4 | 98.30 | 1.1 | 0.6 | — | — | 0.55 | 0.9 |
| CS5 | 98.30 | 1.0 | 0.7 | — | — | 0.70 | 1.1 |
| S1 | 98.30 | 0.85 | 0.85 | — | — | 1.00 | 1.6 |
| S2 | 98.15 | 0.85 | 1.0 | — | — | 1.18 | 1.9 |
| S3 | 97.85 | 0.85 | 1.3 | — | — | 1.53 | 2.5 |
| S4 | 98.00 | 0.70 | 1.3 | — | — | 1.86 | 3.0 |
| S5 | 98.075 | 0.925 | 1.0 | — | — | 1.08 | 1.8 |
| S6 | 98.30 | 0.85 | — | 0.85 | — | 1.00 | 1.2 |
| S7 | 98.00 | 0.85 | — | 1.15 | — | 1.35 | 1.6 |
| S8 | 98.40 | 0.75 | — | — | 0.85 | 1.13 | 1.8 |
| S9 | 98.30 | 0.85 | — | — | 0.85 | 1.00 | 1.6 |

Analyze all of the samples listed in Table 2 according to the MDR and Scorch Improvement procedures outlined in the Test Methods section, above. Results from these analyses are provided in Table 3, below.

TABLE 3

MDR and SI Analysis of Cross-linked Polyethylene Samples

| Sample: | ML @ 180° C. (dN · m) | MH @ 180° C. (dN · m) | MH − ML @ 180° C. (dN · m) | T90 @ 180° C. (min.) | ts1 @ 180° C. (min.) | ts0.5 @ 140° C. (min.) | ts1 @ 140° C. (min.) | Scorch Improvement (min.) |
|---|---|---|---|---|---|---|---|---|
| CS1 | 0.19 | 3.43 | 3.24 | 4.41 | 1.31 | 25.19 | 43.52 | −0.34 |
| CS2 | 0.18 | 3.55 | 3.37 | 4.15 | 1.19 | 26.03 | 42.42 | 0.56 |
| CS3 | 0.19 | 3.66 | 3.47 | 4.12 | 1.18 | 25.54 | 41.55 | 1.13 |
| CS4 | 0.18 | 3.65 | 3.47 | 4.06 | 1.19 | 32.56 | 50.00 | 9.58 |
| CS5 | 0.18 | 3.58 | 3.40 | 3.97 | 1.23 | 31.83 | 50.94 | 9.52 |
| S1 | 0.17 | 3.42 | 3.25 | 4.25 | 1.33 | 36.67 | 59.30 | 15.61 |
| S2 | 0.18 | 3.75 | 3.57 | 4.23 | 1.22 | 35.68 | 55.50 | 16.44 |
| S3 | 0.17 | 3.99 | 3.82 | 4.22 | 1.21 | 35.18 | 55.20 | 19.21 |
| S4 | 0.17 | 3.48 | 3.31 | 4.46 | 1.40 | 44.30 | 69.00 | 26.24 |
| S5 | 0.17 | 3.91 | 3.74 | 4.09 | 1.19 | 33.77 | 52.08 | 15.15 |
| S6 | 0.18 | 3.27 | 3.09 | 4.26 | 1.33 | 35.61 | 56.40 | 10.03 |
| S7 | 0.17 | 3.68 | 3.51 | 4.09 | 1.21 | 32.28 | 49.91 | 10.04 |
| S8 | 0.18 | 3.45 | 3.27 | 4.20 | 1.33 | 35.44 | 54.72 | 11.34 |
| S9 | 0.18 | 3.69 | 3.51 | 4.03 | 1.23 | 33.08 | 50.10 | 10.23 |

As shown in Table 3, compared with the Comparative Samples, S1-S9 show better performance in both curing and anti-scorch. For example, the ts1 @ 140° C. of S4 is almost 70 minutes, which suggests better anti-scorch performance.

Scorch improvement ("SI") is an indicator of the effects of cross-linking coagents on scorch property. It is an effective way to compare the anti-scorch property of samples with the same cross-link density (MH-ML). As shown in the Table 3, as loading of co-agent increases, the SI increases. Furthermore, once the weight ratio of coagent:DCP increases to at least 1 (molar ratio allyl group to active oxygen of at least 1.6), as in Samples S1 to S5, the SI is higher than that of Comparative Samples CS1 to CS4, which have a coagent:DCP weight ratio of less than 1.

Additionally, Samples S6 to S9 shows that TATM and TAC also achieve an SI higher than 10 with a weight ratio of co-agent to DCP higher than 1.

Example 2—Methane Content of Cross-Linked Polyethylene with High Triallyl Coagent:DCP Ratio Prepare two additional Comparative Samples (CS6 and CS7) according to the formulations shown in Table 4, below, using the procedures described in the Test Methods section, above. Comparative Sample CS8, DOW ENDURANCE™ HFDB-4201 SC, is a long-life, unfilled, crosslinkable, low-density, polyethylene insulation compound, available from The Dow Chemical Company, Midland, Mich., USA. The polyethylene and DCP are the same as described above in Example 1.

TABLE 4

Compositions of CS6-CS8

| Sample: | Polyethylene (wt %) | DCP (wt %) | DOW 4201 SC (wt %) |
|---|---|---|---|
| CS6 | 99.3 | 0.7 | — |
| CS7 | 98.6 | 1.4 | — |
| CS8 | — | — | 100 |

Determine the methane content and cross-link density (MH-ML) of Samples S1 and S2, and Comparative Samples CS1, CS3, and CS6-CS8 according to the procedures provided in the above Test Methods section. Results are provided in Table 5, below.

TABLE 5

Methane Content

| Sample: | Methane Content (ppm) | MH-ML @ 180° C. (dN · m) |
|---|---|---|
| S1 | 449.0 | 3.25 |
| S4 | 358.4 | 3.31 |
| CS1 | 863.7 | 3.2 |
| CS3 | 676.5 | 3.47 |
| CS6 | 344.8 | 0.99 |
| CS7 | 707.4 | 2.66 |
| CS8 | 785.1 | 3.16 |

As seen in Table 5, by decreasing DCP loading, the methane content of S1 and S2 is lower than all of the Comparative Samples except for CS6, which only has a DCP loading of 0.7 wt %. CS6, however, has an unacceptably low cross-link density of 0.99 dN·m.

Example 3—Mechanical Properties of Cross-Linked Polyethylene with High Triallyl Coagent:DCP Ratio Determine the mechanical properties (i.e., tensile strength and tensile elongation) of Samples S1-S4 and Comparative Samples CS1-CS5 according to the procedures provided in the above Test Methods section. Results are provided in Table 6, below.

TABLE 6

Mechanical Properties

| Sample: | Tensile Elongation ("TE") at break (%) | Tensile Strength ("TS") at break (MPa) |
|---|---|---|
| S1 | 20.60 | 512.00 |
| S2 | 20.20 | 526.20 |
| S3 | 18.20 | 486.80 |
| S4 | 20.70 | 490.40 |
| CS1 | 20.80 | 539.00 |
| CS2 | 21.40 | 532.00 |
| CS3 | 22.70 | 543.00 |
| CS4 | 19.40 | 491.10 |
| CS5 | 19.10 | 516.00 |

The results provided above show that mechanical properties of Samples S1-S4 are maintained even as the ratio of coagent to DCP increases.

Example 4—Electrical Properties of Cross-Linked Polyethylene with High Triallyl Coagent:DCP Ratio Determine the electrical properties (i.e., dielectric constant and dissipation factor) of Samples S1 and S4 and Comparative Samples CS1 and CS3 according to the procedures provided in the above Test Methods section. Results are provided in Table 7, below.

TABLE 7

Electrical Properties

| Sample: | Dielectric Constant | Dissipation Factor |
|---|---|---|
| S1 | 2.141 | 2.01E−04 |
| S4 | 2.090 | 2.61E−04 |
| CS1 | 2.046 | 2.99E−04 |
| CS3 | 2.019 | 2.46E−04 |

Determine the dissipation factor at high temperature (100° C.), high voltage (20 kV/mm), and 60 Hz for Samples S2 and S3 and Comparative Sample CS8. Results are provided in Table 8, below.

TABLE 8

Electrical Properties

| Sample: | Dissipation Factor @ 100° C. and 20 kV/mm |
|---|---|
| S2 | 1.5E−04 |
| S3 | 1.7E−04 |
| CS8 | 1.4E−04 |

As shown in Tables 7 and 8, although the addition of coagent caused a small increase in dissipation factor at both room temperature and high temperature/high voltage, the Samples still met specification and are within with current industry practice.

Example 5—Cross-Linking Polyethylene with Broad Range of Triallyl Coagent:DCP Ratio Prepare six additional Samples (S10-S15) and one additional Comparative Sample (CS9) according to the formulations shown in Table 9, below, using the procedures described in the Test Methods section, above. The polyethylene employed in these samples is the same as described above in Examples 1-6 (i.e., DFDA-4850 NT, available from the Dow Chemical Company, Midland, Mich., USA). The DCP and TAIC are also the same as described above in Example 1.

TABLE 9

Compositions of CS9 and S10-S15

| Sample: | Polyethylene (wt %) | DCP (wt %) | TAIC (wt %) | Coagent: DCP (weight) | Allyl: Active Oxygen (molar) |
|---|---|---|---|---|---|
| CS9 | 96.9 | 0.1 | 3.0 | 30.0 | 48.8 |
| S10 | 96.6 | 0.4 | 3.0 | 7.5 | 12.2 |
| S11 | 96.5 | 0.5 | 3.0 | 6.0 | 9.8 |
| S12 | 96.0 | 1.0 | 3.0 | 3.0 | 4.9 |
| S13 | 98.0 | 1.0 | 1.0 | 1.0 | 1.6 |
| S14 | 97.6 | 1.2 | 1.2 | 1.0 | 1.6 |
| S15 | 97.2 | 1.4 | 1.4 | 1.0 | 1.6 |

Analyze all of the samples listed in Table 9 according to the MDR and Scorch Improvement procedures outlined in the Test Methods section, above. Results from these analyses are provided in Table 10, below.

TABLE 10

MDR and SI Analysis of Cross-linked Polyethylene Samples

| Sample: | ML @ 180° C. (dN · m) | MH @ 180° C. (dN · m) | MH – ML @ 180° C. (dN · m) | T90 @ 180° C. (min.) | ts1 @ 180° C. (min.) | ts1 @ 140° C. (min.) | Scorch Improvement (min.) |
|---|---|---|---|---|---|---|---|
| CS9 | 0.15 | 0.36 | 0.21 | 8.37 | N/A | N/A | N/A |
| S10 | 0.16 | 2.92 | 2.76 | 6.30 | 2.00 | 121.60 | 68.7 |
| S11 | 0.17 | 3.49 | 3.32 | 5.79 | 1.75 | 100.40 | 57.8 |
| S12 | 0.18 | 6.58 | 6.40 | 4.00 | 0.96 | 37.40 | 19.1 |
| S13 | 0.19 | 4.54 | 4.35 | 4.37 | 1.16 | 50.80 | 20.2 |
| S14 | 0.19 | 5.44 | 5.25 | 4.16 | 1.00 | 38.64 | 14.6 |
| S15 | 0.19 | 6.29 | 6.1 | 3.76 | 0.88 | 30.00 | 10.4 |

The results provided in Table 10 indicate that extremely high molar ratios of allyl-to-active oxygen (e.g., ~50, as in CS9) may be unworkable. However, molar ratios of allyl-to-active oxygen as high as 7.5 to 12.2 (as in S10 and S11) provide excellent scorch improvement while maintaining cross-link density. Additionally, increasing DCP content while maintaining the molar ratio of allyl-to-active oxygen tends to cause decreases in scorch improvement, as shown by comparing S13 through S15.

Example 6—Cross-Linking Polyethylene with Acrylate-Based Coagents

Prepare seven additional Comparative Samples (CS10-CS16) according to the formulations shown in Table 11, below, using the procedures described in the Test Methods section, above.

TABLE 11

Sample Compositions with Acrylate-based Coagents

| Sample: | CS10 | CS11 | CS12 | CS13 | CS14 | CS15 | CS16 |
|---|---|---|---|---|---|---|---|
| Polyethylene (wt %) | 97.961 | 97.793 | 97.373 | 98.090 | 98.070 | 97.451 | 97.519 |
| DCP (wt %) | 0.85 | 0.85 | 0.85 | 0.85 | 0.85 | 0.85 | 0.85 |
| Trimethylolpropane Triacrylate (wt %) | 1.19 | — | — | — | — | — | — |
| Trimethylolpropane Trimethacrylate (wt %) | — | 1.36 | — | — | — | — | — |
| 1,6-Hexanediol Diacrylate (wt %) | — | — | 1.78 | — | — | — | — |
| Pentaerythritol Tetraacrylate (wt %) | — | — | — | 1.06 | — | — | — |
| Dipentaerythritol Pentaacrylate (wt %) | — | — | — | — | 1.08 | — | — |
| Tris(2-hydroxyethyl)isocyanurate Triacrylate (wt %) | — | — | — | — | — | 1.70 | — |
| Poxylated Glyceryl Triacrylate (wt %) | — | — | — | — | — | — | 1.63 |

Analyze all of the samples listed in Table 11 according to the MDR procedure outlined in the Test Methods section, above. Results from these analyses are provided in Table 12, below. Comparative Sample 1 and Sample 2 are provided again in Table 12 for comparison.

TABLE 12

MDR Analysis of Samples Cross-linked with Acrylate-Based Coagents

| Sample: | Vinyl Group (%) | ML @ 180° C. (dN · m) | MH @ 180° C. (dN · m) | MH-ML @ 180° C. (dN · m) | ts1 @ 180° C. (min.) | T90 @ 180° C. (min.) |
|---|---|---|---|---|---|---|
| CS1 | 0 | 0.19 | 3.43 | 3.24 | 1.31 | 4.41 |
| S2 | 0.34 | 0.18 | 3.75 | 3.57 | 1.22 | 4.12 |
| CS10 | 0.34 | 0.22 | 1.93 | 1.71 | 1.97 | 4.33 |
| CS11 | 0.34 | 0.17 | 1.65 | 1.48 | 2.84 | 5.01 |
| CS12 | 0.34 | 0.19 | 1.90 | 1.71 | 1.99 | 4.25 |
| CS13 | 0.34 | 0.23 | 1.84 | 1.61 | 2.26 | 4.35 |
| CS14 | 0.34 | 0.22 | 1.77 | 1.55 | 2.46 | 4.64 |
| CS15 | 0.34 | 0.21 | 1.72 | 1.51 | 2.54 | 4.40 |
| CS16 | 0.34 | 0.20 | 1.67 | 1.47 | 2.55 | 4.58 |

The results provided in Table 12 indicate that acrylate-based coagents do not provide sufficient cross-link density, as evidenced by low MH-ML values.

Example 7—Soaking Coagent and DCP into Polyethylene

Compounding Procedure for Comparative Samples

Feed polyethylene pellets containing antioxidants into a Brabender mixer at 130° C. with the rotor speed of 30 rpm. Once the polyethylene is melted, add the coagent. The mixing time after the addition of coagent is 5 minutes. Next, feed this compound into a two roll mill at 120° C. after preheating the sample in an oven at 90° C. Once the polyethylene compound melts, add the peroxide drop-wise, then mix at a roll speed of 12 rpm and roll distance of 0.6 mm for 4 minutes.

Premixing Procedure for Samples

Place DCP crystals into a bottle, inject TAIC liquid by syringe into the bottle, and place the bottle into a 60° C. oven for about 10 minutes. Remove the bottle, and shake until a homogenous liquid mixture is obtained from the initial two phase liquid.

Soaking Procedure for Samples

Place polyethylene pellets into a bottle, inject liquid DCP, TAIC, or the premixed mixture of TAIC and DCP, into the bottle, seal the bottle, and shake by hand for about 1 minute to ensure the liquid is distributed over all pellets. Then, place the bottle into the oven at 80° C. for 9 hours.

Sample Preparation

Using the procedures just described, prepare two Comparative Samples (CS17 and CS18) and three Samples (S16-S18) using the formulations in Table 13, below. S16 and S17 are prepared by soaking the polyethylene pellets in the mixture of TAIC and DCP. S18 is prepared by sequential soaking of the polyethylene in DCP at 80° C. for 9 hours followed by soaking in TAIC at 85° C. for 9 hours. In each of these samples, the polyethylene, DCP, and TAIC used are the same as described above in Example 1.

TABLE 13

Compositions of CS17, CS18, and S16-S18

| | Sample: | | | | |
|---|---|---|---|---|---|
| | CS17 | CS18 | S16 | S17 | S18 |
| Polyethylene (wt %) | 98 | 98.3 | 98 | 98.3 | 98.3 |
| DCP (wt %) | 0.7 | 0.85 | 0.7 | 0.85 | 0.85 |
| TAIC (wt %) | 1.3 | 0.85 | 1.3 | 0.85 | 0.85 |

Analyze all of the samples listed in Table 13 according to the MDR and SI procedures outlined in the Test Methods section, above. Results from these analyses are provided in Table 14, below.

TABLE 14

MDR and SI Analysis of CS18, CS19, and S16-S18

| | Sample: | | | | |
|---|---|---|---|---|---|
| | CS17 | CS18 | S16 | S17 | S18 |
| ML @ 180° C. (dN · m) | 0.17 | 0.17 | 0.18 | 0.18 | 0.18 |
| MH @ 180° C. (dN · m) | 3.48 | 3.42 | 3.80 | 3.64 | 3.63 |
| MH-ML @ 180° C. (dN · m) | 3.31 | 3.25 | 3.62 | 3.46 | 3.45 |
| T90 @ 180° C. (min.) | 4.46 | 4.25 | 4.51 | 4.39 | 4.27 |
| ts1 @ 140° C. (min.) | 69.00 | 59.30 | 66.16 | 58.10 | 60.30 |
| Scorch Improvement (min.) | 26.2 | 15.6 | 27.7 | 17.5 | 19.6 |

Looking at the results provided in Table 14, above, an increase in MH and comparable scorch time are observed when employing the soaking procedure described above in comparison to the compounding procedure. Specifically, CS17 and S16 have the same composition, yet S16 displayed a higher MH and comparable scorch time. Similarly, CS18, S17, and S18 all have the same composition, yet S17 and S18 exhibit a higher MH and comparable scorch time.

Example 8—Variation of Peroxide

Prepare nine additional Samples (S19-S27) according to the formulations provided in Table 15, below, and using the same procedure described above for preparation of Samples S1-S6, except employing different peroxides. In the following example, BIPB is bis(t-butyl-peroxy isopropyl)benzene, which is commercially available from Shanghai Fangruida Chemical Co., Ltd. LUPROX™ 101 is 2,5-dimethyl-2,5-di(tert-butylperoxy)hexane, which is commercially available from Arkema. DTAP is di-tert-amyl peroxide, which is commercially available from Arkema. The polyethylene, DCP, and TAIC are the same as described above for Samples S1-S6.

TABLE 15

Compositions of S19-S27

| Sample: | Polyethylene (wt %) | BIPB (wt %) | Luprox™ 101 (wt %) | DTAP (wt %) | DCP (wt %) | TAIC (wt %) | Allyl: Active Oxygen (molar) |
|---|---|---|---|---|---|---|---|
| S19 | 98.6 | 0.55 | — | — | — | 0.85 | 1.6 |
| S20 | 98.6 | 0.50 | — | — | — | 0.90 | 1.8 |
| S21 | 98.7 | 0.45 | — | — | — | 0.85 | 1.9 |
| S22 | 98.2 | 0.5 | — | — | — | 1.3 | 2.6 |
| S23 | 98.2 | 0.4 | — | — | — | 1.4 | 3.6 |
| S24 | 97.9 | 0.4 | — | — | — | 1.7 | 4.3 |
| S25 | 98.225 | — | 0.445 | — | — | 1.3 | 2.6 |
| S26 | 97.75 | — | — | 0.5 | — | 1.75 | 3.7 |
| S27 | 97.695 | — | — | 0.4 | 0.155 | 1.75 | 3.7 |

Analyze all of the samples listed in Table 15 according to the MDR procedures outlined in the Test Methods section, above. Results from these analyses are provided in Table 16, below.

TABLE 16

MDR Analysis of Cross-linked Polyethylene Samples S19-S27

| Sample: | ML @ 180° C. (dN · m) | MH @ 180° C. (dN · m) | MH-ML @ 180° C. (dN · m) | ts1 @ 180° C. (min.) | T90 @ 180° C. (min.) |
|---|---|---|---|---|---|
| S19 | 0.17 | 3.5  | 3.33 | 2.3 | 8.3  |
| S20 | 0.17 | 3.21 | 3.04 | 2.8 | 9.6  |
| S21 | 0.16 | 2.96 | 2.80 | 2.7 | 8.6  |
| S22 | 0.18 | 4.03 | 3.85 | 2.0 | 8.2  |
| S23 | 0.17 | 3.64 | 3.47 | 2.4 | 9.2  |
| S24 | 0.16 | 3.38 | 3.22 | 2.9 | 9.6  |
| S25 | 0.16 | 2.64 | 2.48 | 3.6 | 10.4 |
| S26 | 0.17 | 3.93 | 3.76 | 1.9 | 7.6  |
| S27 | 0.18 | 4.31 | 4.13 | 1.6 | 6.6  |

As can be seen from the results provided in Table 16, varying the type of peroxide away from DCP while employing an allyl-to-active oxygen ratio of at least 1.6 still provides a crosslinked polyethylene having adequate cross-link density.

The invention claimed is:

1. A cross-linkable polymeric composition comprising:
a low-density polyethylene homopolymer;
an organic peroxide; and
a polyallyl cross-linking coagent,
wherein said polyallyl cross-linking coagent and said organic peroxide are present in amounts sufficient to provide an allyl-to-active oxygen molar ratio of at least 1.6, based on the allyl content of said polyallyl cross-linking coagent and the active oxygen content of said organic peroxide;
wherein the cross-linkable polymeric composition further comprises an antioxidant that is a hindered phenol or a thio compound.

2. The cross-linkable polymeric composition of claim 1, wherein said organic peroxide is present in said cross-linkable polymeric composition in an amount of less than 1.4 weight percent, based on the combined weight of said low-density polyethylene homopolymer, said organic peroxide, and said polyallyl cross-linking coagent; wherein said polyallyl cross-linking coagent is present in said cross-linkable polymeric composition in an amount of at least 0.5 weight percent, based on the combined weight of said low-density polyethylene homopolymer, said organic peroxide, and said polyallyl cross-linking coagent; wherein said low-density polyethylene homopolymer is present in said cross-linkable polymeric composition in an amount ranging from 50 to 98.9 weight percent, based on the total cross-linkable polymeric composition weight.

3. The cross-linkable polymeric composition of claim 1, wherein said polyallyl cross-linking coagent is a triallyl compound; wherein said organic peroxide is a mono-functional peroxide.

4. The cross-linkable polymeric composition of claim 1, wherein said polyallyl cross-linking coagent is selected from the group consisting of triallyl isocyanurate ("TAIC"), triallyl cyanurate ("TAC"), triallyl trimellitate ("TATM"), and mixtures of two or more thereof; wherein said organic peroxide is dicumyl peroxide.

5. The cross-linkable polymeric composition of claim 1, wherein said polyallyl cross-linking coagent and said organic peroxide are present in amounts sufficient to provide an allyl-to-active oxygen molar ratio of at least 1.9, based on the allyl content of said polyallyl cross-linking coagent and the active oxygen content of said organic peroxide; wherein said cross-linkable polymeric composition is substantially free of scorch inhibitors.

6. A process for producing a coated conductor, said process comprising:
(a) coating a conductor with a cross-linkable polymeric composition, wherein said cross-linkable polymeric composition comprises a low-density polyethylene homopolymer, an organic peroxide, and a polyallyl cross-linking coagent; and
(b) curing or allowing to cure at least a portion of said cross-linkable polymeric composition, thereby forming a cross-linked polymeric coating,
wherein said polyallyl cross-linking coagent and said organic peroxide are present in said cross-linkable polymeric composition in amounts sufficient to provide an allyl-to-active oxygen molar ratio of at least 1.6, based on the allyl content of said polyallyl cross-linking coagent and the active oxygen content of said organic peroxide;
wherein the cross-linkable polymeric composition further comprises an antioxidant that is a hindered phenol or a thio compound.

7. The process of claim 6, wherein said organic peroxide is present in said cross-linkable polymeric composition in an amount of less than 1.4 weight percent, based on the combined weight of said low-density polyethylene homopolymer, said organic peroxide, and said polyallyl cross-linking coagent; wherein said polyallyl cross-linking coagent is present in said cross-linkable polymeric composition in an amount of at least 0.5 weight percent, based on the combined weight of said low-density polyethylene homopolymer, said organic peroxide, and said polyallyl cross-linking coagent; wherein said low-density polyethylene homopolymer is present in said cross-linkable polymeric composition in an amount ranging from 50 to 98.9 weight percent, based on the total cross-linkable polymeric composition weight.

8. The process of claim 6, wherein said polyallyl cross-linking coagent is selected from the group consisting of triallyl isocyanurate ("TAIC"), triallyl cyanurate ("TAC"), triallyl trimellitate ("TATM"), and mixtures of two or more thereof; wherein said organic peroxide is dicumyl peroxide.

9. The process of claim 6, wherein said polyallyl cross-linking coagent and said organic peroxide are present in amounts sufficient to provide an allyl-to-active oxygen molar ratio of at least 1.9, based on the allyl content of said polyallyl cross-linking coagent and the active oxygen content of said organic peroxide; wherein said cross-linkable polymeric composition is substantially free of scorch inhibitors, wherein said cross-linked polymeric coating has a cross-link density (MH-ML) of at least 2.5 dN·m.

10. A cable prepared according to the process of claim 6.

11. A cross-linkable polymeric composition comprising:
a low-density polyethylene homopolymer;
an organic peroxide; and
a polyallyl cross-linking coagent;
wherein said polyallyl cross-linking coagent and said organic peroxide are present in amounts sufficient to provide an allyl-to-active oxygen molar ratio of at least 1.6, based on the allyl content of said polyallyl cross-linking coagent and the active oxygen content of said organic peroxide, wherein said cross-linkable polymeric composition is substantially free of vinyl-functional esters;
wherein the cross-linkable polymeric composition further comprises an antioxidant that is a hindered phenol or a thio compound.

12. The cross-linkable polymeric composition of claim 11, wherein said organic peroxide is present in said cross-linkable polymeric composition in an amount of less than 1.4 weight percent, based on the combined weight of said low-density polyethylene homopolymer, said organic peroxide, and said polyallyl cross-linking coagent; wherein said polyallyl cross-linking coagent is present in said cross-linkable polymeric composition in an amount of at least 0.5 weight percent, based on the combined weight of said low-density polyethylene homopolymer, said organic peroxide, and said polyallyl cross-linking coagent; wherein said low-density polyethylene homopolymer is present in said cross-linkable polymeric composition in an amount ranging from 50 to 98.9 weight percent, based on the total cross-linkable polymeric composition weight.

13. The cross-linkable polymeric composition of claim 11, wherein said polyallyl cross-linking coagent is a triallyl compound; wherein said organic peroxide is a mono-functional peroxide.

14. The cross-linkable polymeric composition of claim 11, wherein said polyallyl cross-linking coagent is selected from the group consisting of triallyl isocyanurate ("TAIC"), triallyl cyanurate ("TAC"), triallyl trimellitate ("TATM"), and mixtures of two or more thereof; wherein said organic peroxide is dicumyl peroxide.

15. The cross-linkable polymeric composition of claim 11, wherein said polyallyl cross-linking coagent and said organic peroxide are present in amounts sufficient to provide an allyl-to-active oxygen molar ratio of at least 1.9, based on the allyl content of said polyallyl cross-linking coagent and the active oxygen content of said organic peroxide; wherein said cross-linkable polymeric composition is substantially free of scorch inhibitors.

* * * * *